(12) United States Patent
Van Nuffel et al.

(10) Patent No.: US 10,563,043 B2
(45) Date of Patent: Feb. 18, 2020

(54) FLAME RETARDANT POLYCARBONATES HAVING HIGH TOTAL LUMINOUS TRANSMITTANCE

(71) Applicant: TRINSEO EUROPE GMBH, Horgen (CH)

(72) Inventors: Claude Van Nuffel, Oostakker (BE); Hung Chang Wu, Taoyuan (TW)

(73) Assignee: TRINSEO EUROPE GMBH, Horgen (CH)

( * ) Notice: Subject to any disclaimer, the term of this patent is extended or adjusted under 35 U.S.C. 154(b) by 0 days.

(21) Appl. No.: 15/458,555

(22) Filed: Mar. 14, 2017

(65) Prior Publication Data

US 2017/0183478 A1 Jun. 29, 2017

Related U.S. Application Data

(63) Continuation-in-part of application No. PCT/IB2014/064526, filed on Sep. 15, 2014.

(51) Int. Cl.
| | |
|---|---|
| *C08K 5/42* | (2006.01) |
| *C08L 69/00* | (2006.01) |
| *C08L 83/04* | (2006.01) |
| *C08K 5/54* | (2006.01) |
| *C08K 7/16* | (2006.01) |
| *C09K 21/08* | (2006.01) |

(52) U.S. Cl.
CPC .................. *C08K 5/42* (2013.01); *C08K 5/54* (2013.01); *C08K 7/16* (2013.01); *C08L 69/00* (2013.01); *C08L 83/04* (2013.01); *C09K 21/08* (2013.01); *C08K 2201/003* (2013.01)

(58) Field of Classification Search
CPC .............. C08K 5/42; C08K 5/54; C08L 69/00
See application file for complete search history.

(56) References Cited

U.S. PATENT DOCUMENTS

| | | | |
|---|---|---|---|
| 2,999,835 A | 9/1961 | Goldberg | |
| 3,028,365 A | 4/1962 | Hermann et al. | |
| 3,036,036 A | 5/1962 | Howe | |
| 3,036,037 A | 5/1962 | Howe | |
| 3,036,038 A | 5/1962 | Howe | |
| 3,036,039 A | 5/1962 | Howe | |
| 3,169,121 A | 2/1965 | Goldberg | |
| 3,334,154 A | 8/1967 | Kim | |
| 3,544,514 A | 12/1970 | Schnell et al. | |
| 4,105,633 A | 8/1978 | Swart et al. | |
| 4,156,069 A | 5/1979 | Prevorsek et al. | |
| 4,225,556 A | 9/1980 | Lothman | |
| 4,260,731 A | 4/1981 | Mori et al. | |
| 4,287,787 A | 9/1981 | Kulanek | |
| 4,330,662 A | 5/1982 | Bales | |
| 4,355,150 A | 10/1982 | Bosnyak | |
| 4,360,656 A | 11/1982 | Swart et al. | |
| 4,374,973 A | 2/1983 | Prevorsek et al. | |
| 4,388,455 A | 6/1983 | Bales | |
| 4,474,999 A | 10/1984 | Mark et al. | |
| 4,652,602 A | 3/1987 | Liu | |
| 5,198,527 A | 3/1993 | Marks | |
| 5,597,887 A | 1/1997 | King et al. | |
| 5,904,673 A | 5/1999 | Roe et al. | |
| 6,613,869 B1 | 9/2003 | Horn et al. | |
| 2004/0066645 A1* | 4/2004 | Graf ........................ | C08L 69/00 362/629 |
| 2011/0306712 A1* | 12/2011 | Inagaki ................... | C08L 69/00 524/165 |
| 2012/0252947 A1 | 10/2012 | Im et al. | |

FOREIGN PATENT DOCUMENTS

| | | |
|---|---|---|
| CN | 102417708 A | 4/2012 |
| CN | 102532857 A | 7/2012 |
| CN | 102786690 A | 11/2012 |
| EP | 0496258 A2 | 7/1992 |
| EP | 1035169 A1 | 9/2000 |
| EP | 1288262 B1 | 10/2005 |
| EP | 2121826 B1 | 1/2011 |
| JP | 2011-084670 A | 4/2011 |
| JP | 2011-116839 A | 6/2011 |
| JP | 2012-036324 A | 2/2012 |
| WO | 2014/133933 A1 | 9/2014 |
| WO | WO-2014133933 A1 * | 9/2014 ........... C08K 5/5419 |

OTHER PUBLICATIONS

International Search Report and Written Opinian, Application No. PCT/IB201/064526 dated May 27, 2015.
Japanese Office Action, JP Application No. 2017-514276 dated May 8, 2018.
Chinese Office Action, CN Application No. 2014-80081961.8 dated Sep. 27, 2018.
Taiwan Search Report, TW Application No. 104130315 dated Aug. 7, 2019.
Second Chinese Office Action, CN Application No. 2014-80081961.8 dated Sep. 27, 2018.
European Office Action, EP Application No. 14776738.8 dated Jun. 18, 2019.

* cited by examiner

*Primary Examiner* — Robert C Boyle
(74) *Attorney, Agent, or Firm* — The Dobrusin Law Firm, P.C.

(57) ABSTRACT

Polycarbonate compositions having good flame retardancy and high light transmittance are achieved using the combination of a polycarbonate, a charring salt flame retardant, and a low molecular weight silicone compound. Light diffusing compositions are achieved using a particulate light diffusing agent. The compositions preferably meet or exceed one or more (and most preferably all) of the following flame retardancy standards: (i) UL-94 V-0 (t=1 mm); (ii) UL-94 5VA (t=2.5 mm); (iii) UL-94 5VB (t=2.5 mm).

20 Claims, No Drawings

FLAME RETARDANT POLYCARBONATES HAVING HIGH TOTAL LUMINOUS TRANSMITTANCE

PRIORITY

The present application is a continuation in part of International Application PCT/IB2014/064526, with an international filing date of Sep. 15, 2014, the contents of which are incorporated herein by reference in its entirety.

FIELD

The present teachings are directed at polycarbonate compositions for use in applications requiring good flame retardancy. The preferred polycarbonate compositions are compositions that are highly transparent. The compositions include light diffusing flame retardant polycarbonate compositions, such as for lighting applications. Preferred compositions have flame retardant properties that meet one or more (e.g., all) of the following UL standards: UL-94 V-0 at 1.0 mm (and higher), UL-94 5VB at 2.5 mm, or UL-94 5VA at 2.5 mm. Such compositions may be particularly useful in various lighting applications.

BACKGROUND

Polycarbonate compositions have been employed for various applications meeting minimal requirements for flame retardancy and/or for having minimal requirements for transparency. Examples of such polycarbonate compositions are described in EP1288262B1 (e.g., describing a broad range of silicone compounds, such as silicone compounds having a degree of polymerization greater than 9 in paragraphs 0191 and 0192, for achieving a minimal level of flame retardancy), EP2121826B1 (e.g., describing composition flame retardant compositions including PTFE, a silsesquioxane, and a charring salt flame retardant), and EP2058369B1 (e.g., describing a broad range of light diffusing technologies and the use of branched silicones for flame retardancy), all incorporated herein by reference in their entirety.

Although EP1288262 B1 describes compositions that meet a portion of the UL-94 V-0 test at 1.5 mm (i.e., the dripping performance after only the first two applications of flame ignition), there is no description of composition meeting the entirety of the UL-94 V-0 test at 1.5 mm. Additionally, EP1288262 B1 does not describe compositions meeting the more demanding test of UL-94 V-0 at 1.0 mm.

Thus, there is a need for materials having improved flame retardancy and improved optical properties for applications where these characteristics are important, such as lighting. For example, there is a need for polycarbonate compositions for use in housings to protect or otherwise shroud the light source (e.g. LED, incandescent bulb, florescent bulb, etc.) and/or to diffuse the light from the light source. For manufacturers to economically produce the housing (e.g., shrouds), there is also a need for polycarbonate compositions having excellent processability characteristics to allow the composition to be formed (e.g., by extruding, injection molding, or blow molding, etc.) into desired shapes.

For example, there continues to exist a need for a highly transparent flame retardant polycarbonate compositions having a high level of transparency (e.g., having a high total luminous transmittance and/or a low haze) and good flame retardancy (e.g., achieving the requirements for one or more of the following UL-94 standards: V-0 at 1.0 mm, 5VB at 2.5 mm, or 5VA at 2.5 mm). For example, there is a need for polycarbonate compositions having a high total luminous transmittance, a low haze, and meeting all of the following UL-94 standards for flame retardancy: V-0 at 1.0 mm, 5VB at 2.5 mm and 5VA at 2.5 mm. In particular, there is a need in lighting applications for polycarbonate compositions having a total luminous transmittance of about 90.0% or more, and a haze of about 1.0% or less (e.g., at a thickness of 1.0 mm).

There is also a continuing need for a light diffusing flame retardant polycarbonate composition having a high level of haze and good flame retardancy (e.g., achieving the requirements for one or more of the following UL-94 standards: V-0 at 1.0 mm, 5VB at 2.5 mm, or 5VA at 2.5 mm). For example, there is a need for polycarbonate compositions having a high total luminous transmittance, high haze, and meeting all of the following UL-94 standards for flame retardancy: V-0 at 1.0 mm, 5VB at 2.5 mm and 5VA at 2.5 mm. In particular, for light diffusing lighting applications, it is desired to have a total luminous transmittance of about 50% or more and a haze of about 50% or more, preferably about 70% or more, and most preferably about 80% or more (at a thickness of 1.0 mm).

Although the previously cited references teach compositions which may have some level of flame retardancy and/or some level of light transmittance/haze, there is no teaching or suggestion for the demanding properties achieved according to the teachings herein, or how one may select from the multitude of ingredients, concentrations, and combinations to achieve these properties.

Prior attempts to achieve polycarbonate formulations that are light diffusing have not achieved the level of flame retardancy, processability, high light transmittance, and high haze required in various applications. For example many diffusing agents negatively impact the flame retardancy of polycarbonate compositions, negatively impact the processability of the composition, or both.

SUMMARY

One aspect of the invention is directed at a transparent flame retardant composition including about 94 weight percent to about 98.9 weight percent polycarbonate, based on the total weight of the composition, and a sufficient amount of one or more flame retardants so that the composition meets or exceeds one or any combination of the following flame retardancy requirements (i) UL-94 5VB at 2.5 mm, (ii) UL-94 5VA at 2.5 mm, or (iii) UL-94 V0 at 1.0 mm, UL-94 5VB at 2.5 mm, and UL-94 5VA at 2.5 mm. Preferably the composition meets or exceeds all of the following: (i) UL-94 5VB at 2.5 mm, (ii) UL-94 5VA at 2.5 mm, and (iii) UL-94 V0 at 1.0 mm, UL-94 5VB at 2.5 mm, and UL-94 5VA at 2.5 mm.

Another aspect of the invention is directed at a flame retardant composition including about 96 weight percent or more polycarbonate (preferably about 98 weight percent to about 98.9 weight percent polycarbonate), based on the total weight of the composition, and a sufficient amount of one or more flame retardants so that the composition meets or exceeds one or any combination of the following flame retardancy requirements (i) UL-94 5VB at 2.5 mm, (ii) UL-94 5VA at 2.5 mm, or (iii) UL-94 V0 at 1.0 mm, UL-94 5VB at 2.5 mm, and UL-94 5VA at 2.5 mm; and has a haze of about 1% or less, and a total luminous transmittance of about 80% or more, both measured according to ASTM D1003 at a thickness of 1 mm.

Another aspect of the invention is directed at a flame retardant composition including about 92 weight percent or more polycarbonate (preferably about 94 weight percent to about 98.9 weight percent polycarbonate), based on the total weight of the composition, about 0.1 weight percent or more of a light diffusing agent and a sufficient amount of one or more flame retardants so that the composition meets or exceeds one or any combination of (preferably, all of) the following flame retardancy requirements (i) UL-94 5VB at 2.5 mm, (ii) UL-94 5VA at 2.5 mm, or (iii) UL-94 V0 at 1.0 mm, UL-94 5VB at 2.5 mm, and UL-94 5VA at 2.5 mm; and has a haze of about 50% or more, measured according to ASTM E2387 at a thickness of 1 mm, and a transparency of about 80% or more, measured according to ASTM D1003 at a thickness of 1 mm.

Any of the aforementioned aspects of the invention may be further characterized by one or any combination of the following: the polycarbonate has an average molecular weight of about 25,000 a.m.u. or more; or the polycarbonate has an average molecular weight of about 30,000 a.m.u. or more; or the polycarbonate has an average molecular weight of about 40,000 a.m.u. or less; or the one or more flame retardants includes a charring salt flame retardant; or the charring salt flame retardant includes or consists essentially of potassium perfluorobutane sulfonate; or the charring salt flame retardant (e.g., the potassium perfluorobutane sulfonate) is present at a concentration of about 0.05 weight percent or more, based on the total weight of the composition; or the charring salt flame retardant (e.g., the potassium perfluorobutane sulfonate) is present at a concentration of about 0.2500 weight percent or less, based on the total weight of the composition; or the charring salt flame retardant includes about 75 weight percent or more potassium perfluorobutane sulfonate, based on the total weight of the charring salt flame retardant; or the flame retardant includes a low molecular weight silicone compound; or the low molecular weight silicone compound is present at a concentration of about 1.1 weight percent or more, based on the total weight of the composition; or the low molecular weight silicone compound is present at a concentration of about 1.9 weight percent or less, based on the total weight of the composition; or the low molecular weight silicone compound has a degree of polymerization of 3 or more; or the low molecular weight silicone compound has a degree of polymerization of 4 or more; or the low molecular weight silicone compound has a degree of polymerization of about 10 or less, or the low molecular weight silicone compound has a degree of polymerization of about 9 or less; or the low molecular weight silicone compound has a degree of polymerization of about 8 or less; or the low molecular weight silicone compound has a degree of polymerization of about 6 or less; or the light diffusing agent has a mean particle diameter of about 0.2 µm or more; or the light diffusing agent has a mean particle diameter of about 20 µm or more; or the low molecular weight silicone compound includes about 30 weight percent or more phenyl groups based on the total weight of the low molecular weight silicone compound; or the low molecular weight silicone compound includes about 75 weight percent or less phenyl groups, based on the total weight of the low molecular weight silicone compound; or the low molecular weight silicone compound includes about 0.10 moles or more Si—H groups per 100 g of the low molecular weight silicone compound; or the low molecular weight silicone compound includes about 1.0 moles or less Si—H groups per 100 g of the low molecular weight silicone compound; or the light diffusing agent is a solid at about 25° C.; or the light diffusing agent is a silicone-based light diffusing agent; or the total weight of the polycarbonate, the charring salt flame retardant, the light weight silicone compound, and the light diffusing agent is about 99.5 weight percent or more; or the total weight of the polycarbonate, the charring salt flame retardant, the light weight silicone compound, and the light diffusing agent is about 100.0 weight percent or less; or the light diffusing agent is present at a concentration of about 4 weight percent or less, based on the total weight of the composition; or the charring salt flame retardant is present at a concentration of about 0.090 weight percent or less, based on the total weight of the composition; or the composition is substantially (e.g., totally) free of PTFE; or the composition is substantially free of (e.g., totally free of) impact modifiers; or the composition is substantially (e.g., totally) free of styrene-containing polymers and polyesters; or the composition includes a UV absorber and/or an optical brightener.

DETAILED DESCRIPTION

Compositions according to the teachings herein may meet one or more of the needs for a transparent flame retardant polycarbonate composition having a high total luminous transmittance (e.g., about 80% or more, preferably about 85% or more, more preferably about 90% or more), having low haze (e.g., about 4% or less, preferably about 2% or less, even more preferably about 1% or less), and good flame retardancy (e.g., meeting or exceeding the requirements for (i) UL-94 5VB at 2.5 mm, (ii) UL-94 5VA at 2.5 mm, or preferably (iii) UL-94 V0 at 1.0 mm, UL-94 5VB at 2.5 mm, and UL-94 5VA at 2.5 mm.

Compositions according to the teachings herein may meet one or more of the needs for a light diffusing flame retardant polycarbonate composition having a high total luminous transmittance (e.g., about 47% or more, preferably about 50% or more, more preferably about 53% or more), having high haze (e.g., about 70% or more, preferably about 80% or more, even more preferably about 90% or more), and good flame retardancy (e.g., meeting or exceeding the requirements for (i) UL-94 5VB at 2.5 mm, (ii) UL-94 5VA at 2.5 mm, or preferably (iii) UL-94 V0 at 1.0 mm, UL-94 5VB, and UL-94 5VA.

The compositions employ combinations of flame retardants and a high concentration of polycarbonate to achieve the unexpected combination of i) high transparency and ii) high level of flame retardancy; while maintaining processability.

Polycarbonate

The compositions according to the teachings herein include one or more polycarbonates. The polycarbonate may include combinations of two or more polymers (e.g., two or more polycarbonates each having a different melt flow rate). The polycarbonate may include one or more branched polymers, one or more linear polymers, or both.

Examples of polycarbonates that may be employed in the flame retardant compositions according to the teachings herein include aromatic carbonate polymers such as the trityl diol carbonates described in U.S. Pat. Nos. 3,036,036; 3,036,037; 3,036,038 and 3,036,039; polycarbonates of bis (arhydroxyphenyl)-alkylidenes (also called bisphenol-A type diols) including their aromatically and aliphatically substituted derivatives such as disclosed in U.S. Pat. Nos. 2,999,835; 3,028,365 and 3,334,154; and carbonate polymers derived from other aromatic diols such as described in U.S. Pat. No. 3,169,121. The polycarbonate may be derived from (1) two or more different dihydric phenols or (2) a dihydric phenol and a glycol or an hydroxy- or acidterminated polyester or a dibasic acid in the event a carbonate copolymer or interpolymer rather than a homopolymer is desired. The one or more polycarbonate may include a blend including, or consisting of one or more of the above carbonate polymers. Additional examples of polycarbonates that may be employed in the flame retardant compositions according to the teachings herein include ester/carbonate copolymers, such as those described in U.S. Pat. Nos. 3,169,121; 4,105,633; 4,156,069; 4,225,556; 4,260,731; 4,287,787; 4,330,662; 4,355,150; 4,360,656; 4,374,973; and 4,388,455. Preferred polycarbonates include polycarbonates of bisphenol-A and derivatives including copolycarbonates of bisphenol-A. By way of further illustration, examples of polycarbonates are described in EP 0496258B1, incorporated herein by reference. The polycarbonate may include a carbonate polymer as described in U.S. Pat. No. 5,904,673, incorporated herein by reference. For example, the polycarbonate may include a blend of a branched polycarbonate and a linear polycarbonate. Methods for preparing carbonate polymers are well known, for example, several suitable methods are disclosed in the aforementioned patents which are hereby incorporated by reference in their entirety.

Preferred branched polycarbonate polymers for use in the flame retardant compositions according to the teachings herein may be prepared by any suitable process. For example, they may be made by reacting a dihydric phenol with phosgene in the presence of a trihydric and/or tetrahydric phenol. U.S. Pat. No. 3,544,514 discloses the process details and this patent is incorporated herein by reference. Blow moldable resins and their desired properties are taught in U.S. Pat. Nos. 4,652,602 and 4,474,999 which are incorporated herein by reference. See also U.S. Pat. Nos. 6,613,869; 5,597,887; and 5,198,527, both incorporated by reference. U.S. Pat. No. 6,613,869, for example, describes a possible approach to the preparation of a branched polycarbonate, pursuant to which a melt transesterification process is employed, along with a trifunctional branching agent (e.g., 1,1,1-tris(4-hydroxyphenyl)ethane; 3,3-bis(3-methyl-4-hydroxyphenyl)-2-oxo-2,3-dihydroindole; or both)).

The polycarbonate may be present at a sufficient concentration so that the composition has one or more generally good optical property, one or more generally good mechanical properties, and/or one or more generally good processability property, such as a property similar to that of the polycarbonate. The polycarbonate may be present in an amount of about 90 weight percent or more, preferably about 92 weight percent or more, more preferably about 94 weight percent or more, and most preferably about 96 weight percent or more, based on the total weight of the composition. The polycarbonate preferably is present in an amount of about 99.5 weight percent or less, more preferably about 99.2 weight percent or less, even more preferably about 99.0 weight percent or less, and most preferably about 98.9 weight percent or less, based on the total weight of the composition.

When employed in a flame retardant composition having high transmittance and low haze according to the teachings herein, the polycarbonate preferably is present at a concentration sufficiently high so that the total luminous transmittance is about 80% or more, about 84% or more, about 88% or more, about 89% or more, or about 90% or more (as measured according to ASTM D1004 at 1 mm). For such compositions, the polycarbonate preferably is present at a concentration of about 95 weight percent or more, more preferably about 97 weight percent or more, even more preferably about 97.6 weight percent or more, even more preferably about 98.0 weight percent or more, and most preferably about 98.1 weight percent or more.

When employed in a light diffusing flame retardant composition, the polycarbonate may be present at an amount sufficiently low so that the composition has generally high haze, such as haze levels according to the teachings herein. For example, the concentration of the polycarbonate may be about 98.9 weight percent or less, preferably about 98.7 weight percent or less, more preferably about 98.5 weight percent or less, and most preferably about 98.3 weight percent or less.

Preferred polycarbonates have a melt flow rate of about 0.3 g/10 min or more, more preferably about 0.8 g/10 min or more, even more preferably about 1.0 g/10 min or more, and most preferably about 1.5 g/10 min or more, as measured according to ISO 1133 at 300° C./1.2 kg. Preferred polycarbonate have a melt flow rate of about 19 g/10 min or less, more preferably about 10 g/10 min or less, even more preferably about 7 g/10 min or less, and most preferably about 5 g/10 min or less.

The polycarbonate preferably has a molecular weight sufficiently high so that the composition has good flame retardant performance. Preferably the polycarbonate has a weight average molecular weight of about 25,000 a.m.u (i.e., atomic mass units) or more, more preferably about 28,000 a.m.u. or more, and most preferably about 30,000 a.m.u. or more. The polycarbonate preferably has a molecular weight sufficiently low so that good flame retardancy performance, good luminous transmittance, and good haze can be maintained after processing. The polycarbonate may exhibit a weight average molecular weight ($M_w$) of about 120,000 a.m.u. or less, more preferably about 90,000 a.m.u. or less, even more preferably about 60,000 a.m.u. or less, even more preferably about 44,000 a.m.u. or less, and most preferably about 42,000 a.m.u. or less. The polycarbonate preferably has a molecular weight sufficiently low so that it can be injection molded, blow molded, extruded, or any combination thereof. For compositions requiring good processing capabilities, the polycarbonate preferably has a weight average molecular weight of about 40,000 a.m.u. or less, more preferably about 38,000 a.m.u. or less, and most preferably about 37,000 a.m.u. or less. "Weight average molecular weight" as employed herein is determined according to a liquid chromatography method by which 0.02 gram samples are prepared by mixing the sample for at least 8 hours with 10 mL of chloroform. The mixture is then filtered through a 0.2μ syringe filter and is analyzed by size exclusion chromatography (SEC). Results are analyzed against a reference material with a known molecular weight. Samples are characterized using two mixed bed columns (e.g., available from Varian, Inc.), coupled with a ultraviolet light detector (e.g., a chromatography absorbance detector, such as Model 757 available from Applied Biosystems). Column temperature is kept at about 35° C. Flow rate of the sample is about 1 ml/min. A tetrahydrofuran eluent is employed for providing sample sizes at about 15 μl each. The unit of measure for the molecular weight is typically daltons.

Preferred properties and characteristics of a polycarbonates for use herein will typically include at least one or any combination of a flexural modulus (tangent) per ASTM D790-07, of about 1800 MPa or more (more preferably about 2200 MPa or more); a flexural modulus of about 3000 MPa or less (more preferably about 2700 MPa or less); a temperature of deflection under load (DTUL)(1.81 MPa) per ASTM D648-07 of about 105° C. or more (more preferably about 125° C. or more, and most preferably about 130° C. or more); a tensile elongation at break per ASTM D638-03

(ISO 527-1) of about 80% or more (more preferably about 90% or more and most preferably about 100% or more); a tensile elongation at break of about 300% or less (e.g., about 200% or less); a notched Izod impact strength per ISO 180/A (at 23° C.) of about 20 kJ/m$^2$ or more (more preferably about 45 kJ/m$^2$ or more and most preferably about 75 kJ/m$^2$ or more); or a notched Izod impact strength of about 180 kJ/m$^2$ or less (e.g., about 130 kJ/m$^2$ or less).

Examples of commercially available polycarbonates include those available from Styron LLC, or its affiliates, under the designation CALIBRE®, such as 200-3 and 600-3.

Charring Salt Flame Retardant

The polycarbonate compositions according to the teachings herein preferably include one or more charring salt flame retardants. The charring salt flame retardant preferably includes an alkali metal salt, an alkaline earth metal salt or both. For example, the charring salt flame retardant may include a potassium salt, a sodium salt, a magnesium salt, a calcium salt, or any combination thereof. Most preferably, the charring salt flame retardant includes or consists essentially of one or more potassium salts. Preferred charring salt flame retardants are salts including one or more sulfur atoms. More preferably, the charring salt flame retardant includes or consists essentially of a sulfonate. The sulfur-containing salt (e.g., the sulfonate) preferably includes one or more carbon containing groups. The number of carbon atoms in the charring salt preferably is about 11 or less, more preferably about 7 or less, and most preferably about 5 or less. The number of carbon atoms in the charring salt flame retardant may be 1 or more, 2 or more, 3 or more, or 4 or more. The carbon containing group preferably is acyclic. The carbon containing group preferably includes one or more halogen atoms (e.g., a fluorine, a chlorine, a bromine, or any combination thereof). By way of example, the carbon containing group may include a fluoroalkane having one or more fluorine atoms (e.g., a perfluoroalkane, such as a perfluorobutane, a perfluorohexane, a perfluoropentane, a perfluoroheptane, a perfluoropropane, or a perfluorooctane). A particularly preferred charring salt flame retardant includes or consists substantially of one or more potassium perfluoroalkanesulfonates, such as potassium perfluorobutanesulfonate. Preferably, the charring salt flame retardant includes potassium perfluorobutanesulfonate at a concentration of about 55 weight percent or more, more preferably about 65 weight percent or more, even more preferably about 75 weight percent or more, and most preferably about 95 weight percent or more, based on the total weight of the charring salt flame retardant.

The charring salt flame retardant preferably is soluble in the polycarbonate at ambient conditions. For example, the charring salt flame retardant preferably does not precipitate out of solution to form particles (e.g., particles having a diameter of about 0.2 µm or more). The charring salt flame retardant preferably is stable (i.e., soluble) in the polycarbonate for about 168 hours or more, about 500 hours or more, about 2,000 hours or more, or about 10,000 hours or more.

The charring salt flame retardant should be present at a concentration sufficiently high so that the composition has a high level of flame retardancy (i.e., meeting the requirements of UL-94 V-0, UL-94 5VA, UL-94 5VB, or any combination thereof). Preferably, the charring salt flame retardant (e.g., the potassium perfluorobutanesulfonate) is present at a concentration of about 0.040 weight percent or more, more preferably about 0.045 weight percent or more, even more preferably about 0.050 weight percent or more, and most preferably about 0.055 weight percent or more.

When employed in a flame retardant composition having high transmittance and low haze according to the teachings herein, the charring salt flame retardant preferably is present at a sufficiently low concentration so that the total luminous transmittance is about 80% or more, about 84% or more, about 88% or more, about 89% or more, or about 90% or more (as measured according to ASTM D1004 at 1 mm). By way of example the charring salt flame retardant (e.g., the potassium perfluorobutanesulfonate) may be present at a concentration of about 0.120 weight percent or less, more preferably about 0.095 weight percent or less, even more preferably about 0.090 weight percent or less, and most preferably about 0.085 weight percent or less, based on the total weight of the composition.

When employed in a flame retardant composition having a high level of light scattering and including a light diffusing agent, higher concentrations of the charring salt flame retardant (e.g., the potassium perfluorobutanesulfonate) may be employed (compared with the compositions having high total luminous transmittance and low haze). However, it has surprisingly been found that at high concentration of the charring salt flame retardant, the composition may not meet one or more of the following flame resistance thresholds: UL-94 V-0; UL-94 5VA; or UL-94 5VB. When employed in a flame retardant composition having a high level of light scattering and including a light diffusing agent, the charring salt flame retardant (e.g., the potassium perfluorobutanesulfonate) preferably is about 0.300 weight percent or less, more preferably about 0.270 weight percent or less, even more preferably about 0.250 weight percent or less, and most preferably about 0.200 weight percent or less (e.g., about 0.100 weight percent or less, or about 0.090 weight percent or less), based on the total weight of the composition.

Low Molecular Weight Silicone Compound

The polymeric composition preferably includes one or more low molecular weight silicone compounds. Without being bound by theory, it is believe that the low molecular weight silicone compound acts as a flame retardant and/or improves the flame retardant effectiveness of one or more other components of the composition. The low molecular weight silicone compound preferably is an oligomer including one or more Si—H groups. The low molecular weight silicone compound may be characterized by a degree of polymerization, n, representing the average (e.g., the weight average) number of monomer units in a molecule. The degree of polymerization preferably is sufficiently high so that the low molecular weight has generally low volatility. As used herein, a silicone compound has low volatility means that the compound does not outgas and/or plate-out during typical processing temperatures for polycarbonate compositions. Preferred low molecular weight silicone compounds have a degree of polymerization (e.g., an average degree of polymerization) of about 2 or more, more preferably about 3 or more, and most preferably about 4 or more. The low molecular weight silicone compound preferably has a sufficiently degree of polymerization so that the composition has a high total luminous transmittance, a low haze, or both. When the degree of polymerization is high (e.g., greater than 9), the low molecular weight silicone compound may cause the composition to have high haze and or low transmittance. Without being bound by theory, it is believed that compounds having an average degree of polymerization greater than 9 may result in partial or total incompatibility with the polycarbonate matrix. The degree of polymerization of the low molecular weight silicone compound preferably is about 9 or less, more preferably about 8 or less, even more preferably about 7 or less, and most preferably about 6 or less. The low molecular weight silicone compound preferably has a melting temperature (e.g., a peak melting temperature) of about 60° C. or less, and most preferably is a liquid at 25° C.

The low molecular weight silicone compound preferably includes one or more Si—H groups. The amount of Si—H groups in the low molecular weight silicone compound preferably is about 0.05 moles pre 100 g or more, more preferably about 0.10 moles per 100 g or more, even more preferably 0.15 moles per 100 g or more, even more preferably about 0.20 moles per 100 g or more, and most preferably about 0.25 moles per 100 g or more, based on the total weight of the low molecular weight silicone compound. The amount of Si—H groups preferably is about 1.2 moles per 100 g or less, more preferably about 1.0 moles per 100 g or less, even more preferably about 0.90 moles per 100 g or less, and most preferably about 0.80 moles per 100 g or less, based on the total weight of the low molecular weight silicone compound.

The low molecular weight silicone compound includes one or more phenyl groups. The amount of phenyl groups in the low molecular weight silicone compound preferably is about 30 weight percent or more, more preferably about 35 weight percent or more, and most preferably about 40 weight percent or more, based on the total weight of the low molecular weight silicone compound. The amount of phenyl groups in the low molecular weight silicone compound preferably is about 75 weight percent or less, even more preferably about 70 weight percent or less, and most preferably about 65 weight percent or less, based on the total weight of the low molecular weight silicone compound.

The low molecular weight silicone compound preferably is present in an amount sufficient for the polymeric composition to have good flame retardancy (i.e., meeting or exceeding the requirements for UL-94 V-0 at 1 mm, UL-94 5VA at 2.5 mm, UL-94 5VB at 2.5 mm, or any combination thereof). Preferably, the concentration of the low molecular weight silicone compound is about 1.1 weight percent or more, more preferably about 1.2 weight percent or more, and most preferably about 1.25 weight percent or more, based on the total weight of the polymeric composition. When the concentration of the low molecular weight flame retardant is above 1.9 weight percent, the flame retardancy characteristics of the polymeric composition may suffer. Preferably, the concentration of the low molecular weight silicone compound is about 1.9 weight percent or less, more preferably about 1.8 weight percent or less, and most preferably about 1.75 weight percent or less, based on the total weight of the polymeric composition.

A particularly preferred low molecular weight silicone compound is KR-2710, available from Shin Etsu. KR-2710 is a phenyl-silicone flame retardant having a refractive index at 25° C. of about 1.52. KR-2710 is a colorless, transparent liquid having a viscosity of about 50 mm$^2$/s, a specific gravity of about 1.07 at 25° C. KR-2710 is a phenyl methyl polysiloxane having Si—H groups.

Higher molecular weight silicone compounds, such as X-40-9800, available from Shin Etsu) are less effective and may not achieve one or more of the performance requirements according to the teachings herein. X-40-9800 is a branched silicone with methyl and phenyl substituents. X-40-9800 is generally free of Si—H groups. X-40-9800 is a powder at 25° C. and has a degree of polymerization of greater than about 10.

The transparent flame retardant polycarbonate compositions according to the teachings herein preferably are substantially free of, or entirely free of i) impact modifiers (such as styrenic block copolymers), ii) fluoropolymers, iii) polyesters (e.g., polyethylene terephthalate, polybutylene terephthalate, or both), or iv) any combination thereof. For example the transparent flame retardant polycarbonate composition may be substantially free (or entirely free) of acrylonitrile-butadiene-styrene block copolymers (i.e., ABS), the transparent flame retardant composition may be substantially free (or entirely free) of methacrylate-butadiene-styrene block copolymers (i.e., MBS), or both. If present the concentration of the impact modifier, such as the styrenic block copolymer (e.g., the concentration of any ABS, the concentration of any MBS, or the total concentration of ABS and MBS) may be about 0.3 weight percent or less, preferably about 0.2 weight percent or less, even more preferably about 0.1 weight percent or less, and most preferably about 0.05 weight percent or less, based on the total weight of the composition. If present the concentration of any polyester (e.g., the concentration of any PET, the concentration of any PBT, or the total concentration of PET and PBT) may be about 0.3 weight percent or less, preferably about 0.2 weight percent or less, even more preferably about 0.1 weight percent or less, and most preferably about 0.05 weight percent or less, based on the total weight of the composition. If present the concentration of any fluoropolymers (e.g., the concentration of any polyfluoroalkanes, such as polytetrafluoretheylene) may be about 0.3 weight percent or less, preferably about 0.2 weight percent or less, even more preferably about 0.1 weight percent or less, and most preferably about 0.05 weight percent or less, based on the total weight of the composition.

Light Diffusing Agent

In one aspect, the compositions are light diffusing compositions according to the teachings herein. The light diffusing compositions may include one or more light diffusing agents. The light diffusing agents may be in the form of solid particles at 25° C. Preferred light diffusing agents remain as solid particles during the processing of the polycarbonate compositions. For example, the light diffusing agent may be a solid at a temperature of about 220° C., about 250° C., about 275° C., about 300° C., or about 325° C. The mean particle size of the light diffusing agents should be sufficiently high so that the particles can diffuse light. For example, the light diffusing agent may have mean particle size of about 0.1 μm or more, preferably about 0.3 μm or more, even more preferably about 0.5 μm or more, even more preferably about 0.7 μm or more, and most preferably about 0.8 μm or more. The mean particle size of the light diffusing agent preferably is about 200 μm or less, more preferably about 80 μm or less, even more preferably about 40 μm or less, even more preferably about 20 μm or less, and most preferably about 10 μm or less.

The ratio of the index of refraction of the light diffusing agent to the index of refraction of the polycarbonate preferably is about 0.8 or more, more preferably about 0.85 or more, even more preferably about 0.90 or more, and most preferably about 0.92 or more. The ratio of the index of refraction of the light diffusing agent to the index of refraction of the polycarbonate preferably is about 1.4 or less, more preferably about 1.25 or less, even more preferably about 1.15 or less, and most preferably about 1.10 or less.

Particularly preferred light diffusing agents are silicone based diffusing agents. They may be generally spherical or may have non-spherical geometries. The light diffusing agent may have a generally smooth surface or may have a surface that is textured or otherwise not generally smooth.

Without limitation examples of light diffusing agents TOSPEARL types, GANZPEARL types, silicone elastomeric powder (e.g., having methacyloxy functionality, such as DOW CORNING® EP-2720 type silicone, now commercially available from DOW CORNING CORPORATION as DOW CORNING 30-424 ADDITIVE), and polysilsesquioxane powders (e.g., polymethylsilsesquioxane spherical powders such as commercially available powders from ABS NANOTECH CO., LTD. as E+ powders, including for example E+508 and E+520).

Preferred compositions are substantially free of, or entirely free of polymeric anti-drip agents having fluorine functional groups. For example, the polycarbonate compositions may be substantially free of, or entirely free of PTFE anti-drip agent Light diffusing compositions according to the teachings herein preferably have a total light transmission of about 47% or more, preferably about 50% or more, and most preferably about 54% or more, as measured according to ASTM D1003 at a thickness of 1.0 mm. The light diffusing compositions may have a haze of about 50% or more, more preferably about 60% or more, even more preferably about 70% or more, and most preferably about 80% or more, as measured according to ASTM E2387 at a thickness of 1.0 mm.

Test Methods

Flame Retardancy

Flame retardancy is tested on specimen having a length of about 125 mm, a width of about 13 mm and a thickness of about 1.0 mm (for UL94 V-0) or 2.5 mm (for UL94 5VB and UL-94 5VA). A first set of 5 specimen are conditioned for 48 hours at 23° C. and 50% relative humidity. A second set of 5 specimen are conditioned for 7 days at 70° C. The specimen is mounted with its length in the vertical direction and is supported at the top of the specimen. For the UL94 V-0 method, the lower end of the specimen is about 10 mm above the burner tube and a vertical blue flame of 20 mm height is applied to the center of the lower edge of the specimen for 10 seconds and then removed. If burning ceases within 30 seconds, the flame is applied for an additional 10 seconds. For UL94 5VA and 5VB, the flame is much more intense and has blue cone extending about 40 mm from the burner tube and a total flame length of about 125 mm and the end of the blue cone is applied to the bottom end of the specimen with the burner angled 20° relative to the vertical direction (i.e., relative to the test specimen).

UL94 V-0: The specimens may not burn with flaming combustion for more than 10 seconds after any application of the test flame; total burn time for a set of 5 specimens may not exceed 50 seconds; the specimens may not burn with flaming or glowing combustion up to the holding clamp; the specimens may not drip flaming particles that ignite a dry absorbent surgical cotton placed 300 mm below the test specimen; and the specimens may not have glowing combustion that persists for more than 30 seconds after the second removal of the test flame.

UL94 5VA and 5VB

Vertical Testing (5VA, 5VB)

Testing is done on bar specimen and plaque specimens. The bar specimen is supported in a vertical position and a flame is applied to one of the lower corners of the specimen at a 20° angle. The flame is applied for 5 seconds and is removed for 5 seconds. The flame application and removal is repeated five times. The procedure for plaques is the same as for bars except that the plaque specimen is mounted horizontally and a flame is applied to the center of the lower surface of the plaque. The flame ignition source for the 5VA and 5VB standard is approximately 5× more severe compared with the flame ignition source for the V-0 standard test. The specimens have a thickness of about 2.5 mm.

In order for the material to meet the UL-94 5VA requirements (i) the specimens must not have any flaming or glowing combustion for more than 60 seconds after the five flame applications; (ii) the specimens must not drip flaming particles that ignite the cotton; and (iii) plaque specimens must not exhibit burn-through (a hole).

In order for the material to meet the UL-94 5VB requirements, (i) the specimens must not have any flaming or glowing combustion for more than 60 seconds after the five flame applications; (ii) the specimens must not drip flaming particles that ignite the cotton; and (iii) the specimens may exhibit burn-through (a hole).

Because the UL-94 5VA and UL-94 5VB tests employ a more severe flame ignition source and do not allow for dripping of any flaming particles, these tests are generally more difficult to pass compared with UL-94 V-0. Typically, in order to pass these more severe flame retardancy tests, high loadings of flame retardants have been employed resulting in compositions having generally low total luminous transmittance.

Transparency

According to the teachings herein, in one aspect, the polymeric composition has a high transparency. Transparency may be determined by total luminous transmittance as measured according to ASTM D1003. For example, the polymeric composition may have a total luminous transmittance (i.e., transmittance) of about 80% or more, preferably about 84% or more, more preferably about 88% or more, even more preferably about 89% or more, and most preferably about 90% or more, as measured according to ASTM D1003, at a thickness of about 1 mm. The total luminous transmittance may be about 100% or less, about 98% or less, about 96% or less, or about 94% or less, as measured according to ASTM D1003, at a thickness of about 1 mm.

Haze may be measured according to ASTM D1003 (Standard Test method for haze and luminous transmittance of transparent plastics) when the haze is about 30% or less. If haze is greater than 30% then it should be tested in accordance with Practice E2387 (ASTM E2387 Standard Practice for Goniometric Optical Scatter Measurements).

It will be appreciated that two or more components of the polymeric composition may react, resulting in one or more reaction products. The description of the polymeric composition includes such reaction products. For example if the composition includes 2 part of reaction product C which is the result of combining 1 part of component A and 1 part of component B, a composition described as having 1 part component A and 1 part component B also describes a composition having 2 parts of reaction product C.

The polymeric compositions according to the teachings herein preferably are capable of being formed into parts using processing equipment typically used with polycarbonate. For example, the polymeric compositions may be formed using a molding machine (e.g., an injection molding machine, a compression molding machine, a press molding molding machine, or an injection molding machine); an extrusion machine (e.g., a sheet extruder, a profile extruder, and the like), or an equipment that forms a parison and then expands the parison by blowing (e.g., air, an inert gas, or other gas) into the parison (such as a blow molding equipment). Preferred compositions are capable of being processed by injection molding, extruding, or blow molding.

The compositions according to the teachings herein may be used in applications requiring good flame retardancy characteristics and or good optical properties. For example, the compositions may be employed in lighting applications. The compositions may find particular advantageous use in a housing component for lighting application devices having a lighting source, where the housing component partially or entirely shrouds the lighting source. For example, the compositions may be used in a device requiring high total luminous transmittance so that substantially all of the light from the lighting source passes through the housing component. In one aspect, the composition may be used in a housing component requiring very low levels of haze. In another aspect, the compositions may be used in a housing component requiring the housing to diffuse the light, and thus requiring a high level of haze.

Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The terms "consisting essentially of" and "consisting substantially of" to describe a composition or combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

EXAMPLES

Compositions according to the teachings herein are prepared by melt blending the polycarbonate with the other components of the composition (e.g., the charring salt flame retardant, the low molecular weight silicone compound). When preparing light diffusing compositions, a light diffusing agent is included in the composition.

A brief description of the materials employed in the various compositions is listed in TABLE 1.

After melt blending the compositions test specimens having a thickness of about 1 mm and about 2.5 mm are prepared. The compositions are tested for total luminous transmittance according to ASTM D1003 using specimen thickness of about 1 mm. The compositions are tested for haze according to ASTM D1003 and/or ASTM E2387 (as appropriate based on the haze values) using specimen thickness of about 1 mm. The compositions are tested for UL-94 V-0 using specimen thickness of about 1 mm. The compositions are tested for UL-94 5VA and UL-94 5VB using specimen thickness of about 2.5 mm. The formulations for the various compositions and test results are listed in Tables 2-10.

TABLE 1

| Material | Grade/Name | Supplier | Description |
| --- | --- | --- | --- |
| Polycarbonate (linear) | CALIBRE 200-3 | STYRON | Melt flow rate = 3; $M_w$ = 33,200 a.m.u. |
| Polycarbonate (branched) | CALIBRE 600-3 | STYRON | Melt flow rate = 3; Mw = 35,000 a.m.u. |
| Polycarbonate (linear) | CALIBRE 200-22 | STYRON | Melt flow rate = 22; $M_w$ = 22,000 a.m.u. |
| Charring salt flame retardant. Potassium salt of perfluorobutanesulfonic acid | C4 | | |
| Potassium salt of a complex of diphenylsulfonesulfonate and diphenyl sulfonedisulfonate | KSS-FR ® | ARICHEM LLC | White powder |
| Low Molecular Weight Silicone Compound. The degree of polymerization is about 3 to 4 Phenyl concentration is about 40%. Includes Si—H at an estimated concentration of 0.3 to 0.4 moles per 100 gram | KR-2710 | SHIN ETSU | Liquid, viscosity is about 50 mm$^2$/s at about 25° C. |
| Silicone | X-40-9800 | SHIN ETSU | |
| Polytetrafluoroethylene (PTFE) | ALGOFLON DF210 | SOLVAY PLASTICS | Fine coagulated powder |

TABLE 1-continued

| Material | Grade/Name | Supplier | Description |
|---|---|---|---|
| MBS Impact Modifier Butadiene/methyl methacrylate/styrene block copolymer | PARALOID 3691A | Dow Chemical Company | Free flowing white powder. |
| Diffusing agent Polymethylsilsesquioxane | TOSPEARL 120S | Momentive Performance Materials, Inc. | Weight average diameter = 2 μm; Index of refraction is about 1.42 |
| Diffusing agent Silicone-based organic spherical beads | GANZPEARL SI-020 | AICA/GANZ Chemical Co., Ltd. | |
| Diffusing agent Silicone-based organic spherical beads | GANZPEARL SI-030 | AICA/GANZ Chemical Co., Ltd. | |
| Diffusing agent Silicone-based organic spherical beads | GANZPEARL SI-045 | AICA/GANZ Chemical Co., Ltd. | |
| Crosslinked elastomeric silicone powder with methacryloxy functionality | DOW CORNING ®_30-242 ADDITIVE | DOW CORNING CORPORATION | Average particle size = 2 μm. |
| Cross-linked Polymethylmethacrylate | TECHPOLYMER MBX-2H | SEKISUI | Mean diameter = 2 μm; refractive index = 1.49 |
| Cross-linked Polymethylmethacrylate | TECHPOLYMER MBX-8 | SEKISUI | Mean diameter = 8 μm; refractive index = 1.49 |
| Cross-linked Polymethylmethacrylate | TECHPOLYMER MBX-30 | SEKISUI | Mean diameter = 30 μm; refractive index = 1.49 |
| Cross-linked Polymethylmethacrylate | TECHPOLYMER MS10X-8B | SEKISUI | |
| Diffusing Agent, spherical silicone resin powder; polymethylsilsesquioxane | E+ 508 | ABC Nanotech | Mean particle size = 0.8 μm; surface area = 20-30 $m^2/g$ |

With reference to TABLE 2, it is seen that when the polycarbonate compositions having high total luminous transmittance (e.g., about 89% or more, or about 90% or more), excellent flame retardancy, and low haze can be achieved using at least 97 weight percent polycarbonate, a charring salt flame retardant (e.g., C4), and a low molecular weight silicone compound. When the molecular weight of the polycarbonate is reduced (see for example Example 3), the flame retardancy of the composition may be unacceptable. With reference to Tables 2-10, it is seen that the performance of the composition may be greatly affected by changes in the concentration of the charring salt flame retardant, changes in the chemical structure of the charring salt flame retardant, changes in the molecular weight of the polycarbonate, changes in the degree of polymerization of the low molecular weight silicone compound, the addition of small concentrations of PTFE, the addition of a styrene block copolymer, the concentration of the low molecular weight silicone compound, the concentration of the light diffusing agent, and the like.

TABLE 2

| | Example 1 | Example 2 | Example 3 | Example 4 | Example 5 | Example 6 | Example 7 |
|---|---|---|---|---|---|---|---|
| Composition (weight percent) | | | | | | | |
| Calibre 200-3 | 98.430 | | | | | | |
| Calibre 600-3 | | 98.430 | | 98.400 | 98.470 | 99.930 | 98.500 |
| Calibre 200-22 | | | 98.430 | | | | |
| C4 | 0.070 | 0.070 | 0.070 | 0.100 | 0.030 | 0.070 | |
| KR-2710 | 1.5 | 1.5 | 1.5 | 1.5 | 1.5 | | 1.5 |
| Properties | | | | | | | |
| UL-94 V-0 at 1.0 mm | PASS | PASS | FAIL | PASS | FAIL | FAIL | FAIL |
| UL-94 5VB at 2.5 mm | PASS | PASS | FAIL | PASS | FAIL | FAIL | FAIL |
| UL-94 %VA at 2.5 mm | PASS | PASS | FAIL | PASS | FAIL | FAIL | FAIL |
| Transmittance at 1 mm, % | 90.3 | 90.2 | 90.5 | 88.7 | 90.4 | 90.3 | 90.7 |
| Haze at 1 mm, % | 0.8 | 0.8 | 0.8 | 2.1 | 0.7 | 0.7 | 0.5 |

TABLE 3

|  | Example 8 | Example 9 | Example 10 | Example 11 | Example 12 | Example 13 | Example 14 |
|---|---|---|---|---|---|---|---|
| Composition (weight percent) | | | | | | | |
| Calibre 600-3 | 98.930 | 97.930 | 98.430 | 98.400 | 98.300 | 98.430 | 99.53 |
| C4 | 0.070 | 0.070 |  |  |  | 0.070 | 0.070 |
| KSS |  |  | 0.070 | 0.100 | 0.200 |  |  |
| KR-2710 | 1.0 | 2.0 | 1.5 | 1.5 | 1.5 |  |  |
| X-40-9800 |  |  |  |  |  | 1.5 |  |
| PTFE |  |  |  |  |  |  | 0.4 |
| Properties | | | | | | | |
| UL-94 V-0 at 1.0 mm | FAIL | FAIL | FAIL | FAIL | FAIL | FAIL | PASS |
| UL-94 5VB at 2.5 mm | FAIL | FAIL | FAIL | FAIL | FAIL | FAIL | PASS |
| UL-94 5VA at 2.5 mm | FAIL | FAIL | FAIL | FAIL | FAIL | FAIL | PASS |
| Transmittance at 1 mm, % | 90.4 | 89.8 | 90.4 | 90.2 | 89.7 | 88.2 | 68 |
| Haze at 1 mm, % | 0.7 | 1.2 | 0.7 | 0.9 | 1.5 | 3.1 | 97 |

With reference to TABLES 4-10 it is seen that light diffusing compositions having good flame retardancy, high total luminous transmittance (e.g., about 50% or more) and high haze can be achieved using compositions according to the teachings herein. However, the flame retardancy and/or light diffusing/transmittance capabilities may be negatively affected by the selection of the light diffusing agent, the concentration of the light diffusing agent, changes in the concentration of the charring salt flame retardant, changes in the chemical structure of the charring salt flame retardant, changes in the molecular weight of the polycarbonate, changes in the degree of polymerization of the low molecular weight silicone compound, the addition of small concentrations of PTFE, the addition of a styrene block copolymer, the concentration of the low molecular weight silicone compound, the concentration of the light diffusing agent, and the like.

TABLE 4

|  | Example 15 | Example 16 | Example 17 | Example 18 | Example 19 | Example 20 | Example 21 |
|---|---|---|---|---|---|---|---|
| Composition (weight percent) | | | | | | | |
| Calibre 600-3 | 98.230 | 97.930 | 97.430 | 96.430 | 98.330 | 98.230 | 97.930 |
| C4 | 0.070 | 0.070 | 0.070 | 0.070 | 0.070 | 0.070 | 0.070 |
| KR-2710 | 1.5 | 1.5 | 1.5 | 1.5 | 1.5 | 1.5 | 1.5 |
| TOSPEARL 120S | 0.2 | 0.5 | 1 | 2 |  |  |  |
| DOW CORNING 30-242 |  |  |  |  | 0.1 | 0.2 | 0.5 |
| Properties | | | | | | | |
| UL-94 V-0 at 1.0 mm | PASS | PASS | PASS | PASS | PASS | PASS | PASS |
| UL-94 5VB at 2.5 mm | PASS | PASS | PASS | PASS | PASS | PASS | PASS |
| UL-94 5VA at 2.5 mm | PASS | PASS | PASS | PASS | PASS | PASS | PASS |
| Transmittance at 1 mm, % | 81.9 | 75.6 | 66.8 | 58 | 80.3 | 74 | 61.1 |
| Haze at 1 mm, % | 93.99 | 98.01 | 98.82 | 99.03 | 89.61 | 97.23 | 99.29 |

TABLE 5

|  | Example 22 | Example 23 | Example 24 | Example 25 | Example 26 | Example 27 | Example 28 |
|---|---|---|---|---|---|---|---|
| Composition (weight percent) | | | | | | | |
| Calibre 600-3 | 97.430 | 98.230 | 97.930 | 97.430 | 96.43 | 98.230 | 97.930 |
| C4 | 0.070 | 0.070 | 0.070 | 0.070 | 0.070 | 0.07 | 0.07 |
| KSS |  |  |  |  |  |  |  |
| KR-2710 | 1.5 | 1.5 | 1.5 | 1.5 | 1.5 | 1.5 | 1.5 |
| GANZPEARL SI-020 |  | 0.2 | 0.5 | 1 | 2 |  |  |
| GANZPEARL SI-030 |  |  |  |  |  | 0.2 | 0.5 |
| DOW CORNING 30-242 | 1 |  |  |  |  |  |  |
| Properties | | | | | | | |
| UL-94 V-0 at 1.0 mm | PASS | PASS | PASS | PASS | PASS | PASS | PASS |
| UL-94 5VB at 2.5 mm | PASS | PASS | PASS | PASS | PASS | PASS | PASS |
| UL-94 5VA at 2.5 mm | PASS | PASS | PASS | PASS | PASS | PASS | PASS |
| Transmittance at 1 mm, % | 54.5 | 82.6 | 72.4 | 63.2 | 56.6 | 81.5 | 75.9 |
| Haze at 1 mm, % | 99.05 | 94.22 | 98.5 | 98.95 | 99.05 | 94.38 | 97.68 |

TABLE 6

|  | Example 29 | Example 30 | Example 31 | Example 32 | Example 33 | Example 34 | Example 35 |
|---|---|---|---|---|---|---|---|
| Composition (weight percent) | | | | | | | |
| Calibre 600-3 | 97.430 | 96.430 | 98.230 | 97.93 | 97.43 | 96.43 | 98.23 |
| C4 | 0.070 | 0.070 | 0.070 | 0.070 | 0.070 | 0.070 | 0.070 |
| KR-2710 | 1.5 | 1.5 | 1.5 | 1.5 | 1.5 | 1.5 | 1.5 |
| GANZPEARL SI-030 | 1 | 2 | | | | | |
| GANZPEARL SI-045 | | | 0.2 | 0.5 | 1 | 2 | |
| Nanotech E+ 508 | | | | | | | 0.2 |
| Properties | | | | | | | |
| UL-94 V-0 at 1.0 mm | PASS | PASS | PASS | PASS | PASS | PASS | PASS |
| UL-94 5VB at 2.5 mm | PASS | PASS | PASS | PASS | PASS | PASS | PASS |
| UL-94 5VA at 2.5 mm | PASS | PASS | PASS | PASS | PASS | PASS | PASS |
| Transmittance at 1 mm, % | 66.5 | 58.9 | 82.9 | 78.9 | 71.3 | 62.6 | 67.63 |
| Haze at 1 mm, % | 98.83 | 99.06 | 83.67 | 90.15 | 97.52 | 98.95 | 97.83 |

TABLE 7

|  | Example 36 | Example 37 | Example 38 | Example 39 | Example 40 | Example 41 | Example 42 |
|---|---|---|---|---|---|---|---|
| Composition (weight percent) | | | | | | | |
| Calibre 200-3 | | 97.430 | | | | | |
| Calibre 600-3 | 97.930 | | 97.930 | 97.430 | 94.430 | 97.430 | 94.430 |
| C4 | 0.070 | 0.070 | 0.070 | 0.070 | 0.070 | 0.070 | 0.070 |
| KR-2710 | 1.5 | 1.5 | 1.5 | 1.5 | 1.5 | 1.5 | 1.5 |
| NANOTECH E+ 508 | 0.5 | | | | | | |
| TOSPEARL 120S | | 1 | | | | | |
| Paraloid 3691A | | | 0.5 | | | | |
| Techpolymer MBX-2H | | | | 1 | 4 | | |
| Techpolymer MBX-8 | | | | | | 1 | 4 |
| Properties | | | | | | | |
| UL-94 V-0 at 1.0 mm | PASS | PASS | FAIL | FAIL | FAIL | FAIL | FAIL |
| UL-94 5VB at 2.5 mm | PASS | PASS | FAIL | FAIL | FAIL | FAIL | FAIL |
| UL-94 5VA at 2.5 mm | PASS | PASS | FAIL | FAIL | FAIL | FAIL | FAIL |
| Transmittance at 1 mm, % | 55.86 | 66.2 | 67.6 | 84.8 | 66.5 | 86.4 | 77.7 |
| Haze at 1 mm, % | 98.99 | 98.95 | 98.5 | 96.54 | 98.88 | 89.6 | 97.94 |

TABLE 8

|  | Example 43 | Example 44 | Example 45 | Example 46 |
|---|---|---|---|---|
| Composition (weight percent) | | | | |
| Calibre 600-3 | 97.430 | 94.430 | 97.930 | 93.930 |
| C4 | 0.070 | 0.070 | 0.070 | 0.070 |
| KR-2710 | 1.5 | 1.5 | 1.5 | 1.5 |
| Techpolymer MBX-30 | 1 | 4 | | |
| Techpolymer MS10X-8B | | | 1 | 4 |
| Properties | | | | |
| UL-94 V-0 at 1.0 mm | FAIL | FAIL | FAIL | FAIL |
| UL-94 5VB at 2.5 mm | FAIL | FAIL | FAIL | FAIL |
| UL-94 5VA at 2.5 mm | FAIL | FAIL | FAIL | FAIL |
| Transmittance at 1 mm, % | 86.1 | 84.3 | 86.2 | 87.6 |
| Haze at 1 mm, % | 56.33 | 92.58 | 77.03 | 95.46 |

TABLE 9

|  | Example 47 | Example 48 | Example 49 |
|---|---|---|---|
| Composition (weight percent) | | | |
| Calibre 600-3 | 97.030 | | 96.430 |
| Calibre 200-22 | | 97.430 | |
| C4 | 0.070 | 0.070 | 0.070 |
| KR-2710 | 1.5 | 1.5 | 1.5 |
| TOSPEARL 120S | 1 | 1 | |
| Paraloid 3691A | | | 2 |
| PTFE | 0.4 | | |
| Properties | | | |
| UL-94 V-0 at 1.0 mm | PASS | FAIL | FAIL |
| UL-94 5VB at 2.5 mm | PASS | FAIL | FAIL |
| UL-94 5VA at 2.5 mm | PASS | FAIL | FAIL |
| Transmittance at 1 mm, % | 45.3 | 67 | 42.1 |
| Haze at 1 mm, % | 99.21 | 98.53 | 99.32 |

TABLE 10

|  | Example 50 | Example 51 | Example 52 | Example 53 | Example 54 | Example 55 | Example 56 |
|---|---|---|---|---|---|---|---|
| Composition (weight percent) | | | | | | | |
| Calibre 200-22 | 97.430 | 97.400 | 97.300 | 98.930 | 97.430 | 97.930 | 96.930 |
| C4 |  |  |  | 0.070 | 0.070 | 0.070 | 0.070 |
| KSS | 0.070 | 0.100 | 0.200 |  |  |  |  |
| KR-2710 | 1.5 | 1.5 | 1.5 |  |  | 1 | 2 |
| X-40-9800 |  |  |  |  | 1.5 |  |  |
| TOSPEARL 120S | 1 | 1 | 1 | 1 | 1 | 1 | 1 |
| Properties | | | | | | | |
| UL-94 V-0 at 1.0 mm | FAIL | FAIL | FAIL | FAIL | FAIL | FAIL | FAIL |
| UL-94 5VB at 2.5 mm | FAIL | FAIL | FAIL | FAIL | FAIL | FAIL | FAIL |
| UL-94 5VA at 2.5 mm | FAIL | FAIL | FAIL | FAIL | FAIL | FAIL | FAIL |
| Transmittance at 1 mm, % | 67 | 66.9 | 66.7 | 67.25 | 64.23 | 67.02 | 66.45 |
| Haze at 1 mm, % | 98.65 | 98.7 | 98.74 | 98.42 | 99.01 | 98.63 | 99.06 |

What is claimed is:

1. A polymeric composition resulting from blending at least:
   i) about 94 weight percent to about 98.9 weight percent of a polycarbonate, based on the total weight of the polymeric composition, wherein the polycarbonate has a weight average molecular weight from 25,000 atomic mass units to about 40,000 atomic mass units;
   ii) about 0.050 percent by weight to 0.090 percent by weight of one or more charring salt flame retardants, based on the total weight of the composition, wherein the one or more charring salt flame retardants includes at least 75 weight percent potassium perfluorobutane sulphonate, based on the total weight of the one or more charring salt flame retardant in the polymeric composition; and
   iii) about 1.1 weight percent to about 1.9 weight percent of a low molecular weight silicone compound having a degree of polymerization from 3 to 6, from 30 weight percent to 70 weight percent phenyl groups based on the total weight of the low molecular weight silicone compound, and 0.10 to 1.0 moles Si—H groups per 100 grams of the low molecular weight silicone compound; and
wherein the total weight of the polycarbonate, the charring salt flame retardant, and the low molecular weight silicone compound is from 99.5 weight percent to 100 weight percent, based on the total weight of the polymeric composition;
wherein the polymeric composition has flame retardant characteristics so that it passes UL-94 V-O at 1.0 mm, UL-94 5VB at 2.5 mm, and UL-94 5VA at 2.5 mm;
wherein the polymeric composition is characterized by a haze of about 1% or less at a thickness of about 1 mm, and a transparency of about 80% or more at a thickness of 1 mm.

2. The polymeric composition of claim 1, wherein the polycarbonate is present at a concentration of about 96 weight percent to about 98.9 weight percent.

3. The polymeric composition of claim 2, wherein the composition is substantially free of PTFE.

4. The polymeric composition of claim 2, wherein the composition is substantially free of styrene-containing polymers and polyesters.

5. The polymeric composition of claim 2, wherein the polycarbonate has a weight average molecular weight of about 30,000 to about 40,000.

6. The polymeric composition of claim 1, wherein the only charring salt flame retardant is potassium perfluorobutane sulphonate.

7. The polymeric composition of claim 1, wherein the polycarbonate is linear.

8. The polymeric composition of claim 2, wherein the concentration of the silicone compound is sufficiently low so that the transparency of the polymeric composition is about 90% or more at a thickness of 1 mm.

9. A polymeric composition resulting from blending at least:
   i) about 94 weight percent to about 98.9 weight percent of a polycarbonate, based on the total weight of the polymeric composition, wherein the polycarbonate has a weight average molecular weight from 25,000 atomic mass units to about 40,000 atomic mass units;
   ii) about 0.050 percent by weight to 0.120 percent by weight of one or more charring salt flame retardants, based on the total weight of the composition, wherein the one or more charring salt flame retardants includes at least 75 weight percent potassium perfluorobutane sulphonate, based on the total weight of the one or more charring salt flame retardant in the polymeric composition; and
   iii) about 1.1 weight percent to about 1.9 weight percent of a low molecular weight silicone compound having a degree of polymerization from 3 to 6, from 30 weight percent to 70 weight percent phenyl groups based on the total weight of the low molecular weight silicone compound, and 0.10 to 1.0 moles Si—H groups per 100 grams of the low molecular weight silicone compound; and
wherein the polymeric composition includes 0.1 to 4 weight percent of one or more light diffusing agents dispersed in the polycarbonate, wherein the light diffusing agent is a particulate material having a mean particle diameter of 0.2 μm to 20 μm;
wherein the polymeric composition has flame retardant characteristics so that it passes UL-94 V-O at 1.0 mm, UL-94 5VB at 2.5 mm, and UL-94 5VA at 2.5 mm;
wherein the polymeric composition is characterized by a transparency of about 50% or more at a thickness of 1 mm; and
the concentration of the light diffusing agent is sufficiently high so that the polymeric composition is characterized by a haze of about 98% or more at a thickness of 1 mm.

10. The polymeric composition of claim 9, wherein the composition is substantially free of PTFE.

11. The polymeric composition of claim 9, wherein the composition is substantially free of styrene-containing polymers and polyesters.

12. The polymeric composition of claim 9, wherein the polycarbonate has a weight average molecular weight of about 30,000 to about 40,000.

13. The polymeric composition of claim 9, wherein the concentration of the silicone compound and the light diffusing agent is sufficiently low so that the transparency of the polymeric composition is about 70% or more at a thickness of 1 mm.

14. The polymeric composition of claim 9, wherein the total weight of the polycarbonate, the charring salt flame retardant, the low molecular weight silicone compound, and the light diffusing agent is from about 99.5 weight percent to about 100 weight percent, based on the total weight of the polymeric composition.

15. A polymeric composition resulting from blending at least:
  i) about 94 weight percent to about 98.9 weight percent of a linear polycarbonate, based on the total weight of the polymeric composition, wherein the polycarbonate has a weight average molecular weight from 25,000 atomic mass units to about 40,000 atomic mass units;
  ii) about 0.050 percent by weight to 0.120 percent by weight of one or more charring salt flame retardants, based on the total weight of the composition, wherein the one or more charring salt flame retardants includes at least 75 weight percent potassium perfluorobutane sulphonate, based on the total weight of the one or more charring salt flame retardant in the polymeric composition; and
  iii) about 1.1 weight percent to about 1.9 weight percent of a low molecular weight silicone compound having a degree of polymerization from 3 to 10, from 30 weight percent to 70 weight percent phenyl groups based on the total weight of the low molecular weight silicone compound, and 0.10 to 1.0 moles Si—H groups per 100 grams of the low molecular weight silicone compound; and wherein the polymeric composition includes 0.1 to 4 weight percent of one or more light diffusing agents dispersed in the polycarbonate, wherein the light diffusing agent is a particulate material having a mean particle diameter of 0.2 μm to 20 μm;

wherein the total weight of the polycarbonate, the charring salt flame retardant, the low molecular weight silicone compound, and the light diffusing agent is from about 99.5 weight percent to about 100 weight percent, based on the total weight of the polymeric composition;

wherein the polymeric composition has flame retardant characteristics so that it passes UL-94 V-O at 1.0 mm, UL-94 5VB at 2.5 mm, and UL-94 5VA at 2.5 mm;

wherein the polymeric composition is characterized by a transparency of about 50% or more at a thickness of 1 mm; the concentration of the light diffusing agent is sufficiently high so that the polymeric composition is characterized by a haze of about 98% or more at a thickness of 1 mm; and the light diffusing agent is silicone based.

16. The polymeric composition of claim 15, wherein the composition includes a UV absorber, an optical brightener, or both.

17. The polymeric composition of claim 15, wherein the low molecular weight silicone compound has a degree of polymerization of 3 to 8.

18. The polymeric composition of claim 15, wherein the low molecular weight silicone compound has a degree of polymerization of 3 to 6.

19. The polymeric composition of claim 16, wherein the low molecular weight silicone compound has a degree of polymerization of 3 to 8.

20. The polymeric composition of claim 16, wherein the low molecular weight silicone compound has a degree of polymerization of 3 to 6.

\* \* \* \* \*